United States Patent [19]
Fletcher et al.

[11] 3,990,860
[45] Nov. 9, 1976

[54] HIGH TEMPERATURE OXIDATION RESISTANT CERMET COMPOSITIONS

[76] Inventors: James C. Fletcher, Administrator of the National Aeronautics and Space Administration, with respect to an invention of; Wayne M. Phillips, La Crescenta, Calif.

[22] Filed: Nov. 20, 1975

[21] Appl. No.: 633,877

[52] U.S. Cl. .............................................. 29/182.5
[51] Int. Cl.² ..................... C22C 29/00; C04B 35/70
[58] Field of Search ...................... 75/206; 29/182.5; 106/55, 57, 58

[56] References Cited
UNITED STATES PATENTS

| | | |
|---|---|---|
| 2,789,341 | 4/1957 | Youssou ............................ 29/182.5 |
| 3,066,391 | 12/1962 | Vordahl ............................ 29/182.5 |
| 3,369,877 | 2/1968 | Humenik, Jr. et al. ............. 29/182.5 |
| 3,526,485 | 9/1970 | Dowihl et al. ..................... 29/182.5 |
| 3,540,862 | 11/1970 | Roemer ............................. 29/182.5 |
| 3,752,655 | 8/1973 | Ramquist ........................... 29/182.5 |
| 3,926,567 | 12/1975 | Phillips ............................ 29/182.5 |

*Primary Examiner*—Brooks H. Hunt
*Attorney, Agent, or Firm*—Monte F. Mott; Wilfred Grifka; John R. Manning

[57] ABSTRACT

Cermet composition having high temperature oxidation resistance, high abrasion and corrosion resistances, and good thermal shock resistance, and particularly adapted for production of high temperature resistant cermet insulator bodies, comprising a sintered body of particles of stainless steel or molybdenum, in a ceramic phase comprised of a ceramic oxide, particularly a ceramic mixture of chromium oxide and aluminum oxide, and forming a coating of chromium oxide as an oxidation barrier around the metal particles, to provide oxidation resistance for the metal particles.

The cermet compositions are designed particularly to provide high temperature resistant refractory coatings on stainless steel or molybdenum substrates.

18 Claims, 1 Drawing Figure

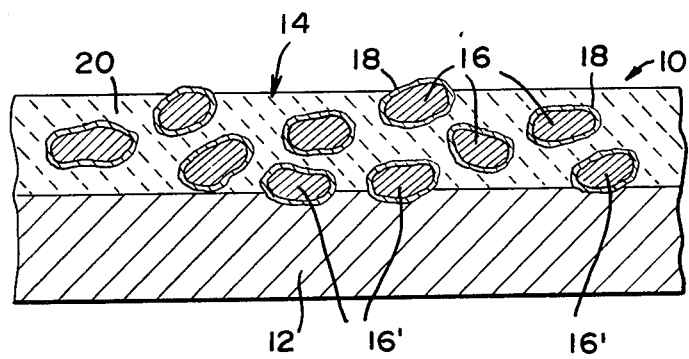

HIGH TEMPERATURE OXIDATION RESISTANT CERMET COMPOSITIONS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention:

This invention relates to production of cermet compositions wherein particles of a metal or metal alloy, are dispersed in a matrix of a ceramic material, and is particularly concerned with the production of cermet compositions of the above type, having high oxidation resistance, high abrasion and corrosion resistance, and good thermal shock resistance, and particularly designed for use as cermet seals for thermionic converters and diodes, and wherein the oxygen-impermeable barrier is provided around the metal or metal alloy particles, imparting oxidation resistance to such particles.

2. Description of the Prior Art:

It is known to strengthen high temperature resistant metals by adding ceramic or refractory metal oxides thereto. It is also known to incorporate high temperature resistant metals into ceramic materials or refractory metal oxides, in order to increase adhesion of the ceramic material or refractory metal oxide to a metal substrate, to provide high temperature resistant refractory coatings on such metal substrates.

In my U.S. application Ser. No. 348,422, filed Apr. 5, 1973, there is disclosed a high strength cermet composition comprising a sintered body consisting of high temperature resistant metal or metal alloy particles such as niobium or niobium alloys, and including iron and chromium, coated with and dispersed in a continuous matrix of a ceramic oxide such as alumina, yttria, zirconia or chromium oxide, and particularly designed for use as cermet seals for thermionic diodes. Although such cermet compositions have been found to be advantageous, cermets having even higher temperature oxidation resistance for application as seals for thermionic converters are required. Also, cermets having improved abrasion and corrosion resistance, coupled with high oxidation resistance are required for this application as well as for other applications including coal gasification equipment. superheaters, and the like.

Oxides are typically permeable to oxygen. Thus, when cermets comprised of metal particles and a ceramic oxide are fabricated, either this permeability of such oxides must be eliminated or the metal particles phase must be provided with oxidation resistance.

The article "High Reliability Protective Coatings For High Temperature Technology," by G. Parugini, et al., Paper 24 7th International Conference on Metal Spraying, September 10 – 14, 1973 London, England, discloses chromium-containing coatings on brazing materials such as nickel alloys, such coatings being resistant to chemical attack by oxygen and combusion gases. Such scale of $Cr_2O_3$ is stated to adhere to the base metal, and a ceramic oxide such as zirconia can be applied over the chromium-containing coating.

DESCRIPTION OF THE INVENTION

In accordance with the present invention it has now been found that certain cermet bodies, particularly having high temperature oxidation resistance, high abrasion and corrosion resistance, as well as high thermal shock resistance, are provided by coating particles of a chromium-containing alloy, e.g. stainless steel, with a ceramic such as aluminum oxide. During sintering a mixture of such alloy particles with the ceramic, an impervious layer of chromium oxide is formed around each metallic particle, so that the resulting cermet is then resistant to further oxidation.

Another approach to providing an oxidation barrier around the metal or metal alloy particles of the cermet involves the incorporation of chromium oxide as a ceramic oxide in the ceramic phase, as well as being formed from chromium metal alloyed with the refractory metal, as noted above, and particularly by a combination of both of these approaches.

The resulting cermet has good thermal shock resistance, very high oxidation resistance due to the formation of a $Cr_2O_3$ coating around each of the metal or metal alloy particles, and high corrosion resistance, particularly when employing aluminum oxide in the ceramic phase. As previously noted, the cermet compositions of the invention are particularly designed as high temperature resistant electrical insulators, especially for use as seals for thermionic converters or diodes. Other diverse applications include use of the cermet, for example, in coal gasification equipment including powdered coal feed nozzles, high temperature ethylene pyrolysis equipment, superheaters, and the like.

The metal or metal alloy particles which are dispersed in and coated with the ceramic for producing the cermet compositions of the invention, are preferably stainless steel, molybdenum or molybdenum-chromium alloy. Stainless steel is a series of high-chromium steels. Type 446 stainless steel, containing about 23 to 27% chromium, the balance substantially iron, and type 430 stainless steel, containing about 14 to about 18% chromium, the balance being substantially iron, in the form of powders, are particularly preferred chromium-containing alloy particles. A molybdenum-chromium alloy, e.g. one containing about 30 to about 40% chromium, the balance substantially molybdenum, is also particularly effective as chromium-containing metal particles. Molybdenum is also highly effective as the metal particles employed in producing the cermet compositions of the invention. When employing non-chromium containing metal particles such as molybdenum, it is necessary that the ceramic employed in admixture with such molybdenum particles, contain chromium oxide, in order to provide the chromium oxide oxidation barrier around the metal particles of the cermet during sintering, according to the invention.

The ceramic or ceramic oxide component of the invention cermets, are particularly aluminum oxide, $Al_2O_3$, yttrium oxide, $Y_2O_3$, or chromium oxide, $Cr_2O_3$, either separately or in admixture. The preferred ceramic oxide is aluminum oxide, alone, and most desirably in combination with chromium oxide. A particularly effective ceramic mixture is comprised of about 10 to about 50% chromium oxide and about 50 to about 90% aluminum oxide, by weight.

For producing cermet bodies having outstanding properties particularly with respect to oxidation resistance, corrosion resistance and thermal shock resistance, preferred combinations of metal or metal alloy particles and ceramic include (a) stainless steel particles, such as the Type 446 or 430 stainless steel particles noted above, in combination with the above noted mixtures of aluminum oxide and chromium oxide, (b) molybdenum particles together with a combination of chromium oxide and aluminum oxide, in the proportions noted above, and (c) molybdenum-chromium alloy particles as noted above, together with a combination of aluminum oxide and chromium oxide particles, in the proportions noted above. Combinations, for example, of stainless steel particles or molybdenum-chromium alloy particles, with aluminum oxide or with yttrium oxide, although providing satisfactory cermet bodies according to the invention, are not the preferred combinations, because the mechanical stability of the resulting cermets are somewhat inferior to those of the above noted preferred cermet compositions, due to some degradation of the chromium-containing metal alloy in building up the required chromium oxide coating around the metallic particles during the sintering operation. As previously noted, it is necessary to seal the ceramic, e.g. aluminum oxide, by providing an effective chromium oxide coating around the metal or metal alloy particles, so as to substantially reduce the oxygen permeability of the ceramic to low levels. Such chromium oxide barrier or seal is most effectively formed by the reaction of the chromium in the chromium-containing alloy such as stainless steel or molybdenum-chromium alloy, with aluminum oxide and/or yttrium oxide, and the chromium oxide also preferably present in the ceramic, which results in a solid solution of high chromium oxide content and which also can contain some aluminum oxide and/or yttrium oxide, forming such oxidation barrier.

It is further noted that the above refractory metal or metal alloy particles have thermal expansion coefficients substantially matching the thermal expansion coefficients of the above ceramic oxide or ceramic oxide mixtures, resulting in cermet bodies having high thermal shock resistance.

When producing the cermet according to the invention, a mixture of the metal or metal particles, that is, for example, stainless steel or molybdenum particles, and the ceramic component, e.g. a mixture of chromium oxide and aluminum oxide, is placed in an autoclave or a hot press, in association with a suitable metal substrate, such as a stainless steel substrate, and this combination is subjected to elevated temperatures and pressures to form the chromium oxide barrier around the metal particles and at the same time bonding the refractroy metal particles of the mixture to the ceramic, e.g. aluminum oxide particles, to produce a strong bond between such metal particles and the ceramic matrix, and a cermet body of high temperature oxidation resistance and having the additional advantageous properties noted above. In the resulting cermet composition, the metal, e.g. molybdenum or iron particles having the chromium oxide barrier layer surrounding such particles, are coated with and dispersed in and bonded to a continuous matrix of the ceramic component, e.g. aluminum oxide.

The above noted sintering operation is carried out at temperature ranging from about 1,000° to about 1,500° C, preferably about 1,000° to about 1,200° C. The upper limit of temperature during sintering is governed by the melting point of the metal substrate, e.g. stainless steel, or the metal component in the cermet. The pressures during the hot pressing operation can range from about 1,000 to about 10,000, preferably about 1,000 to about 5,000, psi.

If desired, although not preferred, cold pressing of the metal or metal alloy particles-ceramic mixture can first be carried out, e.g. under the above noted pressures, followed by sintering the cold pressed body, at temperatures within the ranges noted above.

In carrying out the process for producing the cermet composition of the invention, the metallic particles of e.g. stainless steel or molybdenum, are first preferably sieved to obtain uniform particle size and eliminate fine particles, preferably less than 0.001 inch in diameter, so as to obtain metal or metal alloy particles having a diameter generally ranging from about 0.001 to about 0.125 inch, preferably from about 0.001 to about 0.010 inch in diameter.

The metallic particles are then preferably washed in soap or detergents, and water, and rinsed. Preferably biodegradable detergents free of phosphates are employed, since these do not leave a static charge on the particles. An alkaline type detergent marketed as "Shaklee's Basic I" has been found effective, but any soap or detergent can be employed which will remove any grease or processing residue on the metal particles.

The washed metallic particles are then further preferably washed in acetone and dried. However, any solvent can be used which evaporates clean from the particles, including alcohol and benzene. Solvents such as kerosene are not desirable since they tend to form a residue on the particles.

The mixture of particles of the ceramic components, e.g. aluminum oxide, or a mixture of chromium oxide and aluminum oxide, are sieved to eliminate coarse particles, preferably particles of a size greater than 1/10 the size of the metallic particles. Thus, the size of the ceramic particles is preferably less than 1/10 the diameter of the metal particles. Usually, the ceramic particles are of a size ranging from about 0.01 to about 0.05 the diameter of the metal particles or spheres.

The proportions of metal particles to the ceramic powder mixture can vary. The greater the proportion of metal particles to the ceramic powder, the better the mechanical properties, particularly tensile strength of the resulting cermet, and the better the adhesion characteristics of the cermet to a metal substrate. However, sufficient ceramic in relation to metal powder is required to permit coating the metal particles with the required chromium oxide barrier layer and to provide a uniform coating of the ceramic around the metal particles and the chromium oxide layer thereon. Generally from about 5 to about 40%, preferably about 20 to about 30%, by volume of the metal, e.g. molybdenum or stainless steel particles or spheres can be present in the total composition of metallic particles and ceramic powder.

In preferred practice, prior to mixing the metal particles of powder with the ceramic mixture or powder, a binder is added to the metal particles to aid in obtaining a more uniform coating of the ceramic powder on the metal particles, and a more uniform dispersion of such particles within the ceramic matrix. Preferred binders for this purpose are any suitable wax, for example, paraffin wax, carnauba wax or beeswax. Preferably, the wax is applied warm, that is in melted condition, or it can be applied in a solvent solution, to the metal particles, to uniformly coat the particles with the binder. A suitable material is a solution of benzene saturated with beeswax. The coating of the metal particles with the wax can be conveniently accomplished by warm ball milling the metal particles or spheres with the melted wax or by placing the metal particles in a solvent solution of the wax, e.g. benzene saturated with beeswax, decanting excess solution and drying the particles.

Although not as desirable, alternative binders also can be employed, such as polyvinyl alcohol, aqueous soap solution, amyl acetate, butyl acetate, and nitrocellulose diluted with butyl alcohol.

Usually, only sufficient binder is employed to obtain a thin layer or coating of the binder on the metal or metal alloy particles. The amount of binder generally employed to achieve this result can range from about 1 to about 10% by volume of the mixture of metal or metal alloy particles, and binder.

If desired, a small amount of binder also can be added to the ceramic oxide powder, in addition to adding the binder to the metal particles, as described above, prior to mixing such metal or metal alloy particles with the ceramic oxide powder. However, usually the addition of the binder to the ceramic oxide powder is not necessary, where as in preferred practice, the binder is added to the metal or metal alloy particles.

The metal particles, preferably coated with a binder such as beeswax or paraffin, as noted above, is then mixed with the ceramic or ceramic components mixture under conditions to obtain a homogeneous mixture of metal particles or spheres, uniformly coated with the ceramic powder. Preferably, the mixture is warmed slightly, e.g. at temperature ranging from about 30 to about 60° C to provide greater adherence of the coated metal particles to the ceramic powder. The mixture is processed as by tumbling to permit the ceramic particles to adhere to the wax coating on the metal particles, thus coating the metal particles with the ceramic particles. The tumbled mixture is then preferably sieved to break up any clusters of the metallic particles.

The resulting mixture is then subjected to firing or sintering at high temperature and pressure to produce the high temperature oxidation resistant cermet according to the invention, as described above. This is effectively accomplished by placing the mixture composed of the metal particles distributed in and coated with the ceramic particles, in an autoclave or hot press for carrying out a high pressure, high temperature autoclaving operation, preferably within the temperature and pressure ranges noted above. Time for sintering or autoclaving generally can range from about 10 to about 60 minutes. As previously noted, such sintering operation results in the formation of unoxidized metal particles surrounded by a thin impermeable coating of chromium oxide, having a thickness ranging, for example, from about 5 to about 100 microns, such particles being bonded to the ceramic matrix which separates the chromium oxide coated metal particles from each other and forms an insulator between such particles. The result is that the cermet body of the invention has highly improved properties of high temperature oxidation resistance, thermal shock resistance and resistance to corrosion.

The exposed metal particles or spheres at the surfaces of the cermet body form metallic anchors which extend into the cermet structure so that the metallic substrates which may be attached to the cermet body to form a metal-cermet composite, and which may have the same composition, that is molybdenum or stainless steel, as the metal particles of the cermet body, are more readily anchored to the cermet body by means of the strong interfacial bond between such exposed particles at the surface of the cermet body and the adjacent metal substrate.

The single FIGURE of the accompanying drawing, more fully described in Example 1, illustrates such a composite.

The cermet bodies of the invention comprising e.g. the molybdenum of stainless steel particles, having a chromium oxide coating, dispersed in the continuous matrix of ceramic, have substantially the same proportions of metal particles or spheres, and ceramic material, based on the original starting mixture of these components noted above for producing the cermet bodies of the invention. However, the density of the ceramic particles in the cermet body is increased because of the hot pressing operation. Accordingly, the proportion of metal or metal alloy particles in the cermet ranges from about 10 to about 70%, preferably from about 30 to about 60%, by weight, the remainder being ceramic material.

The cermet bodies produced according to the invention have good hardness and strength, corresponding to a micro hardness of about 100 to about 500, $Kg/mm^2$ and a tensile strength generally ranging from about 5,000 to about 25,000 psi. The cermet bodies of the invention have high temperature resistance up to about 1,000° C, or higher, and the cermet bodies hereof also have high electrical insulation effectiveness. For example, a cermet body formed of molybdenum or stainless steel particles and a ceramic comprised of aluminum oxide and chromium oxide has an electrical insulation effectiveness of 10 megohm-cms at 1,000° C. The electrical insulation effectiveness for the various cermet bodies of the invention at about 1,000° C can range from about 1 to about 100 megohm-cms.

The following are examples of practice of the invention, but it is understood that such examples are not intended as limitative of the invention.

EXAMPLE 1

Type 446 stainless steel particles of about 0.002 inch in diameter were sieved and washed in "Shaklee Basic I" solvent, and washed in acetone and dried.

The stainless steel particles were then placed in a solution of benzene saturated with beeswax. Excess solvent was drained off and the resulting stainless steel particles coated with beeswax were then dried.

A mixture of 80% aluminum oxide and 20% chromium oxide, by weight, was sieved to remove course particles and provide a resulting ceramic powder of a particle size less than about 0.0002 inch diameter.

The wax coated stainless steel particles were then mixed with the ceramic powder, in a proportion of 30% of the stainless steel particles and 70% of the ceramic mixture, by volume, and the resulting mixture was tumbled. Following tumbling, a stainless steel substrate to be coated with the cermet was placed on a graphite die of a hot press, and the mixture of ceramic particles adhering to the wax coated surface of the stainless steel particles, and thus coating the stainless steel particles with the ceramic particles, was placed over the stainless steel substrate in the hot press. The resulting assembly was then hot pressed at 1,200°C and about 5,000 psi for about 15 minutes.

Referring to the drawing, the final sintered product is a composite 10 of a stainless steel substrate 12 having bonded thereto a cermet coating 14 comprised of stainless steel particles 16 surrounded by an impermeable chromium oxide layer or coating 18, the chromium oxide coated stainless steel particles being separated from each other and dispersed in and bonded to a matrix 20 comprised of aluminum oxide and chromium oxide. The cermet body 14 is bonded to the stainless steel substrate 12, particularly by means of the stainless steel metal particles, such as 16' which protrude from the lower surface of the cermet body 14 and are embedded in the upper surface of the stainless steel substrate 12.

The cermet body 14 of chromium oxide coated stainless steel particles dispersed in the chromium oxide-aluminum oxide ceramic matrix, has properties of high oxidation resistance, high corrosion resistance and good thermal shock resistance, and is particularly suitable for use as seals for thermionic converters.

EXAMPLE 2

The procedure of Example 1 was repeated, employing molybdenum particles of about 0.002 inch in diameter, and such particles were coated using a solution of benzene saturated with paraffin wax.

The ceramic powder was a mixture of about 50% chromium oxide and about 50% aluminum oxide, by weight. The ceramic powder and wax coated molybdenum particles were mixed in proportions of 20% molybdenum particles and 80% ceramic mixture, by volume.

Following tumbling, the resulting cermet mixture was hot pressed in contact with a molybdenum substrate, the hot pressing operation being carried out at about 1,500° C and at pressure of about 5,000 psi for a period of about 15 minutes.

The resulting composite formed of molybdenum particles containing a chromium oxide barrier layer dispersed in a chromium oxide-aluminum oxide ceramic matrix, is similar to the composite produced in Example 1. The cermet coating has properties of high oxidation resistance, high corrosion resistance and good thermal shock resistance, comparable to the cermet body 14 obtained in Example 1. The resulting composite of the present example can also be employed as a highly effective seal for thermionic converters.

EXAMPLE 3

The procedure of Example 1 was followed employing stainless steel particles as in Example 1 and aluminum oxide as the ceramic, in a proportion of 30% stainless steel particles and 70% aluminum oxide, by volume.

The resulting cermet comprised of stainless steel particles coated with an aluminum oxide barrier layer and dispersed and bonded in an aluminum oxide cermet, has properties of high oxidation resistance, high corrosion resistance and good thermal shock resistance comparable to the cermet bodies produced in Examples 1 and 2, but the mechanical stability of the cermet is somewhat inferior to the mechanical stability of the cermets of Examples 1 and 2.

EXAMPLE 4

The procedure of Example 3 was followed but employing yttrium oxide as the ceramic in place of aluminum oxide.

The results obtained were similar to those obtained in Example 3.

EXAMPLE 5

The procedure of Example 1 was followed except that in place of the stainless steel particles, particles of molybdenum-chromium alloy containing about 35% chromium, the balance substantially molybdenum, of a particle size of about 0.002 inch diameter, was employed.

Results obtained were similar to those obtained in Example 1.

The composites particularly of Examples 1, 2 and 5 are also effective for use in the production of high temperature coal fired equipment and superheaters.

From the foregoing, it is seen that the invention provides novel cermet compositions formed particularly of molybdenum or stainless steel particles, coated with an oxidation impermeable layer or barrier of chromium oxide, and dispersed in a ceramic of aluminum oxide, yttrium oxide and/or chromium oxide, providing a body or coating having high temperature oxidation and corrosion resistance, and good thermal shock resistance, and having a wide variety of applications, e.g. for use as electrical insulation seals for thermionic converters.

It is noted that although the above cited prior art article by Parugini, et al discloses chromium-containing coatings as a protective coating on a metal or metal alloy substrate to resist oxidation, there is no disclosure or suggestion in this article of the present invention directed to an improved cermet composition comprised of certain metal or metal alloy particles containing an impermeable chromium oxide coating, and dispersed in and bonded to a matrix of certain ceramic oxides, to provide a barrier against passage of oxygen through the ceramic oxides and into direct contact with the metal or metal alloy particles.

While I have described particular embodiments of the invention for the purposes of illustration, it will be understood that various changes and modifications can be made therein within the spirit of the invention, and the invention accordingly is not to be taken as limited except by the scope of the appended claims.

What is claimed is:

1. A high temperature oxidation resistant cermet composition comprising a sintered body consisting essentially of metal or metal alloy particles selected from the group consisting of stainless steel, molybdenum and molybdenum-chromium alloy particles, said particles having a chromium oxide coating, said chromium oxide coated particles being dispersed in and bonded to a matrix of a ceramic selected from the group consisting of aluminum oxide, yttrium oxide, mixtures thereof, and said oxides in admixture with chromium oxide.

2. A cermet composition as defined in claim 1, said metal or metal alloy particles being stainless steel particles, and said ceramic being a mixture of about 10 to about 50% chromium oxide and about 50 to about 90% aluminum oxide, by weight.

3. A cermet composition as defined in claim 1, said metal or metal alloy particles being molybdenum particles, and said ceramic being a mixture of about 10 to about 50% chromium oxide and about 50 to about 90% aluminum oxide, by weight.

4. A cermet composition as defined in claim 1, said metal or metal alloy particles being molybdenum-chromium alloy particles and said ceramic being a mixture of about 10 to about 50% chromium oxide and about 50 to about 90% aluminum oxide, by weight.

5. A cermet composition as defined in claim 1, said metal or metal alloy particles being stainless steel particles and said ceramic being aluminum oxide.

6. A cermet composition as defined in claim 1, said metal or metal alloy particles being present in an amount ranging from about 10 to about 70%, by weight.

7. A cermet composition as defined in claim 1, said metal particles being present in an amount ranging from about 30 to about 60%, by weight.

8. A cermet composition as defined in claim 2, said stainless steel particles being present in an amount ranging from about 10 to about 70%, by weight.

9. A cermet composition as defined in claim 3, said molybdenum particles being present in an amount ranging from about 10 to about 70%, by weight.

10. A cermet composition as defined in claim 4, said molybdenum-chromium alloy particles being present in an amount ranging from about 10 to about 70%, by weight.

11. A cermet composition as defined in claim 2, said stainless steel particles being present in an amount ranging from about 30 to about 60%, by weight.

12. A cermet composition as defined in claim 3, said molybdenum particles being present in an amount ranging from about 30 to about 60%, by weight.

13. A composite comprising a high temperature oxidation resistant cermet composition as defined in claim 1, and a metal substrate selected from the group consisting of stainless steel and molybdenum.

14. A composite comprising a high temperature oxidation resistant cermet composition as defined in claim 2, and a stainless steel substrate.

15. A composite comprising a high temperature oxidation resistant cermet composition as defined in claim 3, and a molybdenum substrate.

16. A composite comprising a high temperature oxidation resistant cermet composition as defined in claim 4, and a molybdenum substrate.

17. A composite comprising a high temperature oxidation resistant cermet composition as defined in claim 8, and a stainless steel substrate.

18. A composite comprising a high temperature oxidation resistant cermet composition as defined in claim 9, and a molybdenum substrate.

* * * * *